United States Patent
Takato

(10) Patent No.: US 7,556,390 B2
(45) Date of Patent: Jul. 7, 2009

(54) ILLUMINATION CHANGE INSTRUMENT CLUSTER

(75) Inventor: Kenichi Takato, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 165 days.

(21) Appl. No.: 11/650,791

(22) Filed: Jan. 8, 2007

(65) Prior Publication Data

US 2007/0159805 A1     Jul. 12, 2007

Related U.S. Application Data

(60) Provisional application No. 60/758,054, filed on Jan. 11, 2006.

(51) Int. Cl.
    *G01D 11/28*     (2006.01)

(52) U.S. Cl. .............................. 362/27; 362/23; 362/29; 116/288

(58) Field of Classification Search ............. 362/23–30, 362/551, 555; 116/286–288, 48, 49
See application file for complete search history.

(56) References Cited

U.S. PATENT DOCUMENTS

| | | | | |
|---|---|---|---|---|
| 2,603,129 | A * | 7/1952 | Dreyer | 359/437 |
| 3,603,282 | A * | 9/1971 | Abromaitis | 116/288 |
| 4,380,043 | A * | 4/1983 | Takamatsu et al. | 362/26 |
| 5,295,049 | A * | 3/1994 | Terada | 362/27 |
| 6,408,784 | B1 * | 6/2002 | Ross | 116/288 |
| 6,741,184 | B1 * | 5/2004 | Miller et al. | 340/815.78 |
| 6,981,464 | B2 * | 1/2006 | Birman | 116/288 |
| 7,216,997 | B2 * | 5/2007 | Anderson, Jr. | 362/27 |
| 7,388,813 | B2 * | 6/2008 | Su | 368/79 |
| 2003/0079672 | A1 | 5/2003 | Kalashnikov et al. | |
| 2004/0004826 | A1 | 1/2004 | Wakaki et al. | |

OTHER PUBLICATIONS

International Search Report and Written Opinion dated Sep. 20, 2007.

* cited by examiner

*Primary Examiner*—Bao Q Truong

(57) ABSTRACT

An instrument cluster assembly includes a dial face having a pointer assembly for indicating a specific measured perimeter. The pointer assembly includes an inner portion and an outer portion that are selectively and independently illuminated.

16 Claims, 5 Drawing Sheets

US 7,556,390 B2

ILLUMINATION CHANGE INSTRUMENT CLUSTER

CROSS REFERENCE TO RELATED APPLICATION

The application claims priority to U.S. Provisional Application No. 60/758,054 which was filed on Jan. 11, 2006.

BACKGROUND OF THE INVENTION

This invention generally relates to an instrument cluster assembly that includes a pointer that can be selectively illuminated. More particularly, this invention relates to an instrument cluster assembly with a pointer with different parts that can be selectively illuminated.

An instrument cluster for a motor vehicle includes a dial with a scale indicative of a vehicle performance or operational parameter. A pointer is rotated about a central axis to point to a specific indicator on the dial to communicate the current state of the measured parameter. The basic configuration of an instrument cluster is modified to provide a desired aesthetic appearance to the interior of a vehicle. Because the instrument cluster is an integral part of vehicle operation, automotive manufactures continually update and improve the appearance of the vehicle instrumentation.

An instrument cluster assembly can be equipped with an illuminated pointer. The illuminated pointer is provided by directing light into the pointer from a fixed light source. The pointer includes reflective surfaces to direct light through the pointer. Different styles and shapes of pointer are provided to provide a desired appearance. This structure provides for the illumination of the entire pointer, not specific portions.

Accordingly, it is desirable to design and develop a pointer assembly with different portions that can be illuminated independently.

SUMMARY OF THE INVENTION

An example instrument cluster includes a pointer having an outer portion and an inner portion that are independently and selectively illuminated.

An example gauge assembly includes a pointer assembly having an inner portion and an outer portion. The outer portion points to one scale of the dial gauge where the inner portion points to a different scale. The outer portion and inner portion of the pointer assembly are illuminated by different light sources and can thereby be independently illuminated.

A first light emitting diode (LED) is mounted on a main circuit board and a second LED is mounted to an auxiliary circuit board that is electrically connected to the main circuit board. The auxiliary circuit board is mounted above the pointer assembly and directs light downwardly onto the inner pointer portion of the pointer assembly and dial face. The first LED directs light upwardly into the outer portion of the pointer assembly. The different light sources are independently actuated to selectively light the inner and outer portions of the pointer assembly.

Accordingly, the example pointer assembly includes independently illuminatable portions to provide different desired lighting schemes for an instrument cluster.

These and other features of the present invention can be best understood from the following specification and drawings, the following of which is a brief description.

DETAILED DESCRIPTION OF THE PREFERRED EMBODIMENT

Figure 1:
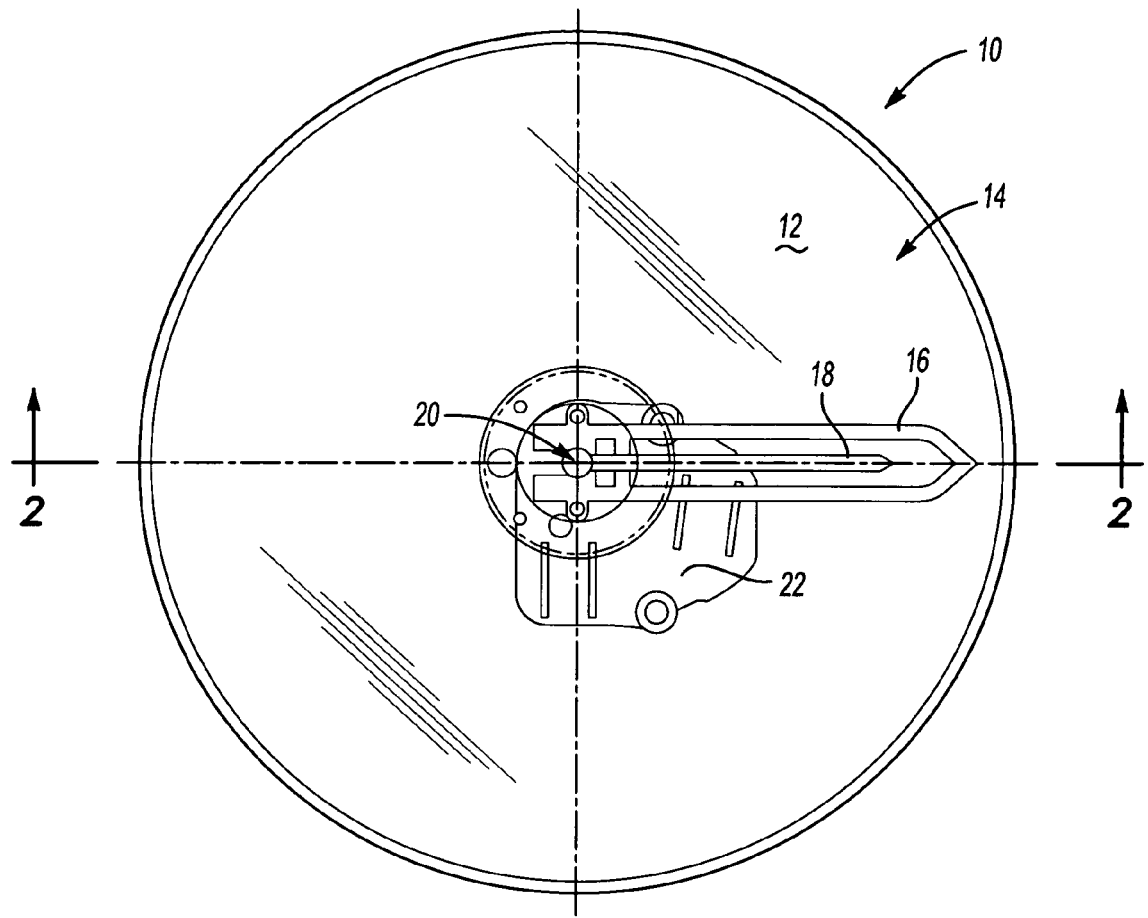
FIG. 1 is a front view of an example dial gauge assembly.

Referring to FIG. 1, an example gauge assembly 10 includes a dial face 12 and a pointer assembly 14. The pointer assembly 14 includes an outer pointer portion 16 and an inner portion 18. The pointer assembly 14 rotates about an axis 20 and is driven by a motor 22. The example pointer assembly 14 is only one configuration possible. Although the illustrated example pointer assembly includes an inner and outer portion, other separately lightable pointer configurations are possible within the scope of this disclosure.

Figure 2:
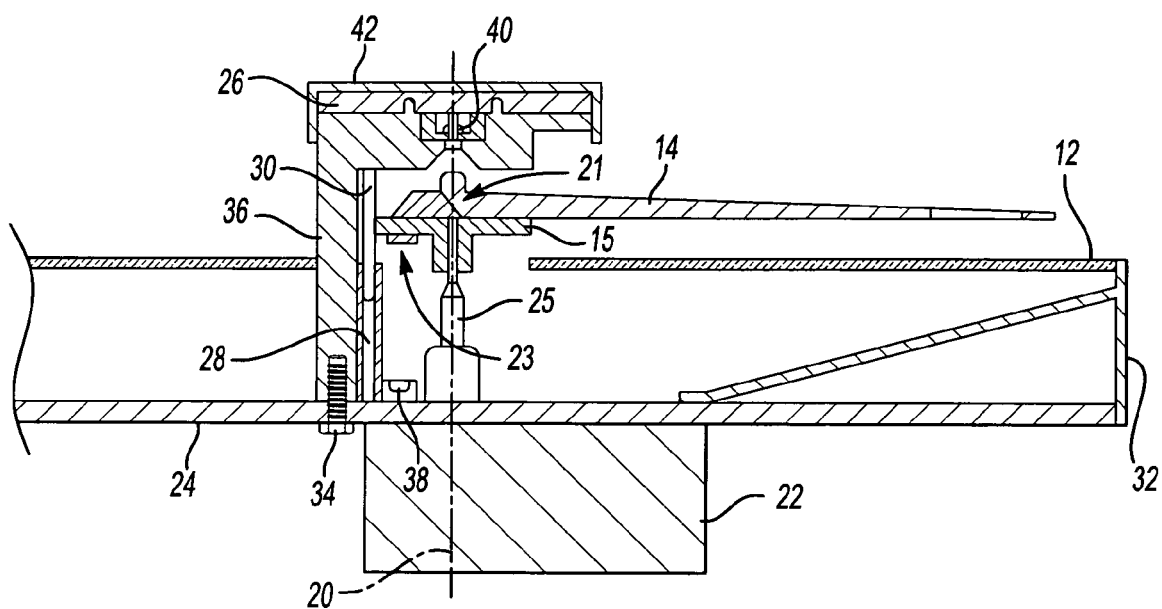
FIG. 2 is a cross-sectional view of the example dial gauge assembly.

Referring to FIG. 2, the outer portion 16 is illuminated by a first light emitting diode (LED) 38 and the inner portion 18 is illuminated by a second LED 40. The first LED 38 is mounted on a main circuit board 24. The main circuit board 24 is disposed below the dial face 12 and provides a mounting location for the motor 22. The motor 22 includes a shaft 25 to which a mount 15 for the pointer assembly 14 is mounted.

The main circuit board 24 includes a connector socket 28 into which a connector pin 30 is received. The connector pin 30 extends downward from an auxiliary circuit board 26. The auxiliary circuit board 26 is mounted above the pointer assembly 14 and held in place by a light support 36. The light support 36 supports the auxiliary circuit board 26 that includes the second LED 40.

The second LED 40 is disposed substantially along the central axis 20. The light mount 36 includes a light housing that directs light from the LED 40 downwardly onto the pointer assembly 14 and dial face 12. The inner portion 18 includes a reflective surface 21 that directs light from the second LED 40 through the inner portion 18. Because the second LED 40 is disposed along the central axis 40 light is directed into the central portion 18 of the pointer assembly 14.

The first LED 38 mounted on the main circuit board is mounted a distance from the axis 25 to illuminate the outer portion 16 of the pointer 14. The outer portion 16 includes a second reflective surface 23 that directs light from the first LED through the outer portion 16. The inner and outer portions 18, 16 of the pointer assembly 14 can be illuminated independently with the separate LEDs 38, 40.

The first LED 38 may be of a different color or intensity than the second LED 40 to provide a desired color and illumination scheme. Alternatively, different colors for the inner and outer portions 18, 16 of the pointer assembly 14 can be provided with coatings of different colors. Further, a worker with the benefit of this disclosure would understand how to sequentially or preferentially illuminate specific portions of the pointer assembly to provide the desired aesthetic appearance.

Figure 3:
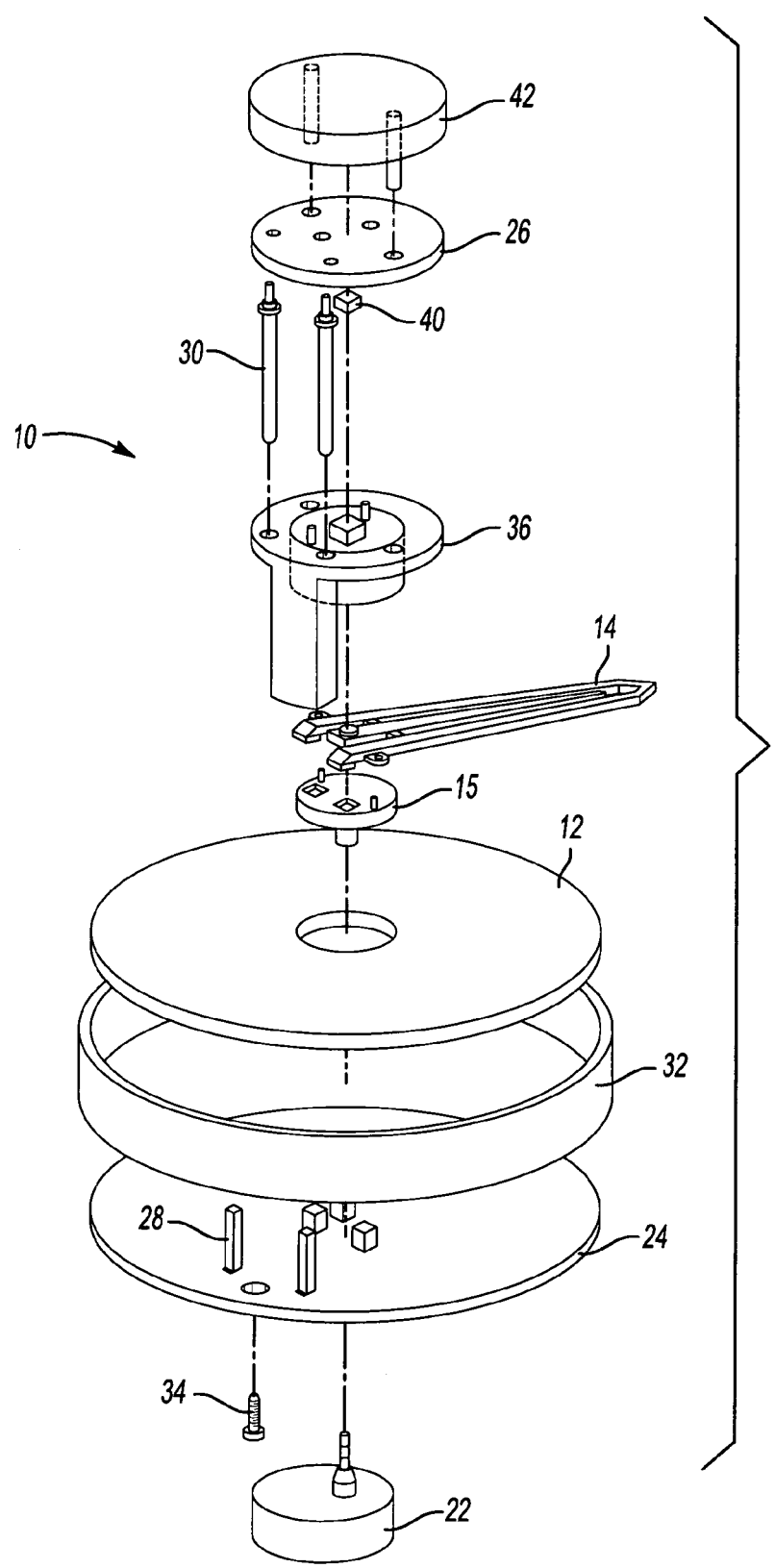
FIG. 3 is an exploded view of the example dial gauge assembly.

Referring to FIG. 3, an exploded view of the dial gauge assembly 10 is illustrated. The exploded view shows the cap 42 that is placed over the auxiliary circuit board 26. The auxiliary circuit board 26 in turn provides a mounting location for the LED 40. The LED 40 is disposed along the central axis 20. The auxiliary circuit board 26 includes connector pins 30 that extend through the light support 36 and engage connectors 28 on the main circuit board 24.

The main circuit board 24 provides a mounting location for the first LED 38. In this example, three LEDs 38 are illustrated, however any number of LEDs as are required to provide the desired uniform illumination and brightness of the outer pointer portion 16 may be utilized. The dial face 12 is mounted within a housing 32 that is also mounted adjacent the main circuit board 24. The pointer assembly 14 is mounted on the pointer mount 15 which is in turn mounted to the shaft 25 of the motor 22. Rotation of the shaft 25 rotates the pointer assembly 14 about the axis 20 to indicate a desired perimeter on the dial face 12.

Figure 4:
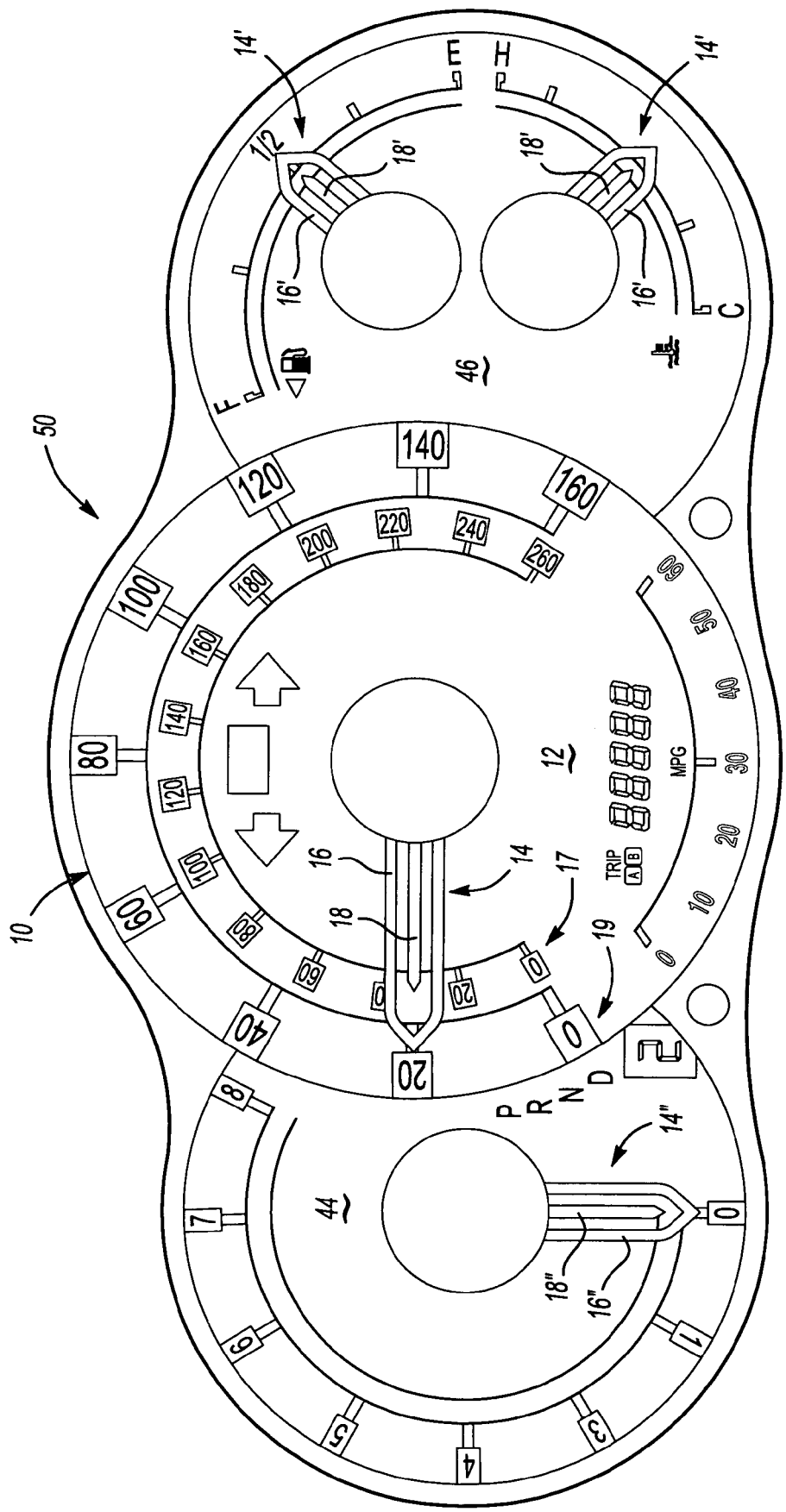
FIG. 4 is an example instrument cluster assembly in a non-illuminated condition.

Referring to FIG. 4, an instrument cluster assembly 50 includes several gauge assemblies including the dial face 12. The outer portion 16 points to an outer scale 19 and the inner portion 18 points to an inner scale 17. The example gauge assembly 10 is utilized as a speedometer that includes the outer scale 19 in miles per hour (MPH) and the inner scale 17 in kilometers per hour (KPH). The space between the inner portion 18 and the outer portion 16 provides for a clear view of the inner scale 17 which is in this example is the KPH scale. The instrument cluster illustrated in FIG. 4 is in a non-illuminated condition. In this condition neither of the pointer portions 16, 18 are illuminated.

The instrument cluster 50 also includes auxiliary gauges with auxiliary dial faces 14', 14". These dial faces also includes pointer assemblies 14', 14". The dial face 46 includes two pointer assemblies 14' that each have inner and outer portions 16' and 18'.

Another dial gauge assembly 44 includes a single pointer assembly 14". The dial face 44 provides an indication of engine speed (RPM). The dial gauge 46 provides an indication of fuel level and also of coolant temperature. As appreciated, the example cluster assembly 50 includes several gauges that communicate information to a vehicle operator. A worker with the benefit of this disclosure would understand that other gauges and information that are commonly equipped in vehicles to provide the communicating information to an operator could also utilize the pointer assemblies of this invention.

Figure 5:
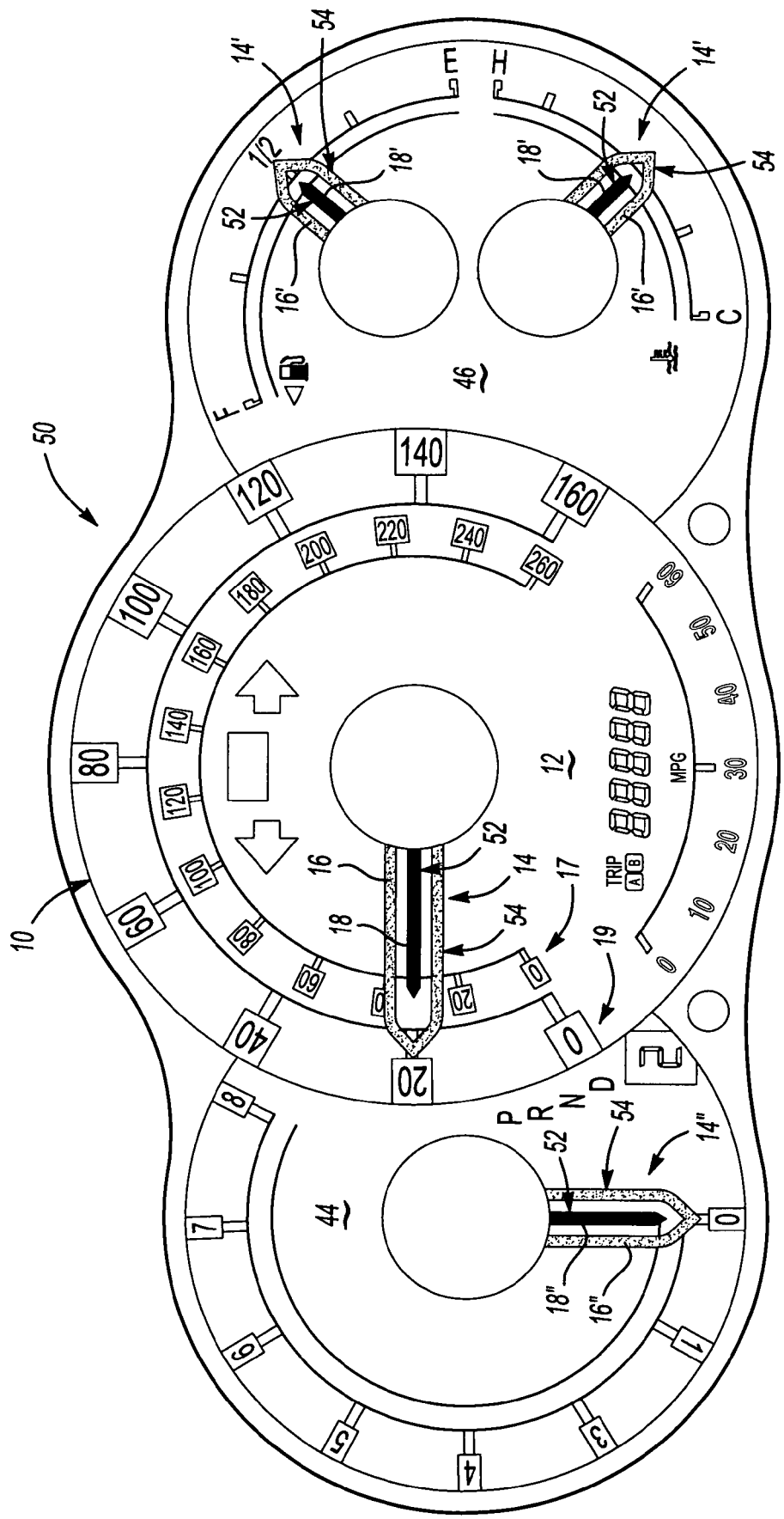
FIG. 5 is the example instrument cluster assembly in an illuminated condition.

Referring to FIG. 5, the pointer assemblies 14, 14', 14" are illustrated in an illuminated condition. In the example illuminated condition the inner pointer portions 18' and 18" are illuminated in a first color 52 (indicated by the dark shading) and the outer portions 16, 16', 16" are illuminated in a second color 54 (indicated by the lighter shading). The independent illumination of different portions of the pointer assemblies 14, 14', 14" provide for different lighting schemes as may be desired.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument cluster assembly comprising:
a dial face including a scale for indicating a desired parameter;
a pointer assembly including a first portion and a second portion;
a first light source disposed below the pointer for illuminating the first portion only; and
a second light source disposed above the pointer for illuminating the second portion only.

2. The assembly as recited in claim 1, wherein the first portion comprises an outer pointer and the second portion comprises an inner pointer disposed within the outer pointer.

3. The assembly as recited in claim 2, wherein the outer pointer includes a first reflective surface and the inner pointer includes a second reflective surface.

4. The assembly as recited in claim 3, wherein the first light source directs light onto the first reflective surface and the second light source directs light onto the second reflective surface.

5. The assembly as recited in claim 1, wherein the first light source and the second light source are operable independent of each other.

6. The assembly as recited in claim 1, including a main circuit board disposed below the pointer assembly and an auxiliary circuit board disposed above the pointer assembly, wherein the first light source is mounted to the main circuit board, and the second light source is mounted to the auxiliary circuit board.

7. The assembly as recited in claim 6, wherein the first light source directs light onto a first side of the pointer assembly and the second light source directs light onto a second side of the pointer assembly that is opposite the first side.

8. The assembly as recited in claim 1, wherein the first portion includes a first color and the second portion includes a second color different than the first color.

9. The assembly as recited in claim 1, wherein the first light source comprises a first color and the second light source comprise a second color different than the first color.

10. The assembly as recited in claim 1, wherein the second light source directs light onto the dial face.

11. A vehicle gauge assembly comprising:
a dial face including an inner scale and an outer scale;
a pointer assembly including an outer pointer for indicating on the outer scale and an inner pointer for indicating on the inner scale;
a first light source for illuminating the outer pointer; and
a second light source for illuminating the inner pointer, wherein the outer pointer is illuminatable independent of the inner pointer.

12. The assembly as recited in claim 11, wherein the outer scale is disposed concentrically about the inner scale on the dial face; wherein the inner pointer and outer pointer communicate at least one condition of a monitored vehicle operating parameter.

13. A vehicle gauge assembly comprising:
a dial face including an inner scale and an outer scale;
a pointer assembly including an outer pointer for indicating on the outer scale and an inner pointer for indicating on the inner scale;
a first light source for illuminating the outer pointer;
a second light source for illuminating the inner pointer, wherein the outer pointer is illuminatable independent of the inner pointer;
a main circuit board disposed below the pointer assembly that includes the first light source; and
an auxiliary circuit board disposed above the pointer assembly that includes the second light source.

14. The assembly as recited in claim 13, wherein the second light source is disposed along an axis of rotation of the pointer assembly.

15. The assembly as recited in claim 14, wherein the inner pointer includes a reflective surface disposed along the axis of rotation.

16. The assembly as recited in claim 11, wherein the first light source is spaced apart from the axis of rotation of the pointer assembly.

* * * * *